United States Patent
Heikura et al.

(10) Patent No.: US 9,948,002 B2
(45) Date of Patent: Apr. 17, 2018

(54) ANTENNA APPARATUS WITH AN INTEGRATED PROXIMITY SENSOR AND METHODS

(71) Applicant: Pulse Finland OY, Kempele (FI)

(72) Inventors: Ilkka Heikura, Kempele (FI); Heikki Korva, Tupos (FI)

(73) Assignee: PULSE FINLAND OY, Oulunsalo (FI)

(*) Notice: Subject to any disclaimer, the term of this patent is extended or adjusted under 35 U.S.C. 154(b) by 231 days.

(21) Appl. No.: 14/566,584

(22) Filed: Dec. 10, 2014

(65) Prior Publication Data
US 2016/0061983 A1    Mar. 3, 2016

Related U.S. Application Data

(60) Provisional application No. 62/042,020, filed on Aug. 26, 2014.

(51) Int. Cl.
| | |
|---|---|
| *H01Q 5/378* | (2015.01) |
| *H01Q 1/24* | (2006.01) |
| *H01Q 1/44* | (2006.01) |
| *H01Q 9/04* | (2006.01) |

(52) U.S. Cl.
CPC .......... *H01Q 5/378* (2015.01); *H01Q 1/243* (2013.01); *H01Q 1/44* (2013.01); *H01Q 9/0407* (2013.01); *H04M 2250/12* (2013.01)

(58) Field of Classification Search
CPC .................................................... H01Q 1/243
See application file for complete search history.

(56) References Cited

U.S. PATENT DOCUMENTS

| | | | |
|---|---|---|---|
| 2,745,102 A | 5/1956 | Norgorden |
| 3,938,161 A | 2/1976 | Sanford |
| 4,004,228 A | 1/1977 | Mullett |
| 4,028,652 A | 6/1977 | Wakino et al. |

(Continued)

FOREIGN PATENT DOCUMENTS

| CN | 1316797 | 10/2007 |
|---|---|---|
| CN | 101958455 A | 1/2011 |

(Continued)

OTHER PUBLICATIONS

"An Adaptive Microstrip Patch Antenna for Use in Portable Transceivers", Rostbakken et al., Vehicular Technology Conference, 1996, Mobile Technology for The Human Race, pp. 339-343.

(Continued)

*Primary Examiner* — Jermele M Hollington
*Assistant Examiner* — Feba Pothen
(74) *Attorney, Agent, or Firm* — Gazdzinski & Associates, PC

(57) ABSTRACT

Wireless wide area network (WWAN) antenna with integrated sensor and methods of using the same. In one embodiment, an antenna subsystem and proximity sensing subsystem share a grounded antenna component/parasitic element. The parasitic element can be used to broaden the operating band of the antenna feeding component and provide an input (via a capacitance change) to a proximity sensor. The parasitic element is, in one embodiment, coupled in parallel to the proximity sensor allowing for a reduction in noise due to increased isolation between the antenna subsystem and the sensing subsystem.

20 Claims, 8 Drawing Sheets

(56) References Cited

U.S. PATENT DOCUMENTS

| | | |
|---|---|---|
| 4,031,468 A | 6/1977 | Ziebell et al. |
| 4,054,874 A | 10/1977 | Oltman |
| 4,069,483 A | 1/1978 | Kaloi |
| 4,123,756 A | 10/1978 | Nagata et al. |
| 4,123,758 A | 10/1978 | Shibano et al. |
| 4,131,893 A | 12/1978 | Munson et al. |
| 4,201,960 A | 5/1980 | Skutta et al. |
| 4,255,729 A | 3/1981 | Fukasawa et al. |
| 4,313,121 A | 1/1982 | Campbell et al. |
| 4,356,492 A | 10/1982 | Kaloi |
| 4,370,657 A | 1/1983 | Kaloi |
| 4,423,396 A | 12/1983 | Makimoto et al. |
| 4,431,977 A | 2/1984 | Sokola et al. |
| 4,546,357 A | 10/1985 | Laughon et al. |
| 4,559,508 A | 12/1985 | Nishikawa et al. |
| 4,625,212 A | 11/1986 | Oda et al. |
| 4,653,889 A | 3/1987 | Bizouard et al. |
| 4,661,992 A | 4/1987 | Garay et al. |
| 4,692,726 A | 9/1987 | Green et al. |
| 4,703,291 A | 10/1987 | Nishikawa et al. |
| 4,706,050 A | 11/1987 | Andrews |
| 4,716,391 A | 12/1987 | Moutrie et al. |
| 4,740,765 A | 4/1988 | Ishikawa et al. |
| 4,742,562 A | 5/1988 | Kommrusch |
| 4,761,624 A | 8/1988 | Igarashi et al. |
| 4,800,348 A | 1/1989 | Rosar et al. |
| 4,800,392 A | 1/1989 | Garay et al. |
| 4,821,006 A | 4/1989 | Ishikawa et al. |
| 4,823,098 A | 4/1989 | DeMuro et al. |
| 4,827,266 A | 5/1989 | Sato et al. |
| 4,829,274 A | 5/1989 | Green et al. |
| 4,835,538 A | 5/1989 | McKenna et al. |
| 4,835,541 A | 5/1989 | Johnson et al. |
| 4,862,181 A | 8/1989 | PonceDeLeon et al. |
| 4,879,533 A | 11/1989 | De Muro et al. |
| 4,896,124 A | 1/1990 | Schwent |
| 4,907,006 A | 3/1990 | Nishikawa et al. |
| 4,954,796 A | 9/1990 | Green et al. |
| 4,965,537 A | 10/1990 | Kommrusch |
| 4,977,383 A | 12/1990 | Niiranen |
| 4,980,694 A | 12/1990 | Hines |
| 5,016,020 A | 5/1991 | Simpson |
| 5,017,932 A | 5/1991 | Ushiyama et al. |
| 5,043,738 A | 8/1991 | Shapiro et al. |
| 5,047,739 A | 9/1991 | Kuokkanene |
| 5,053,786 A | 10/1991 | Silverman et al. |
| 5,057,847 A | 10/1991 | Vaeisaenen |
| 5,061,939 A | 10/1991 | Nakase |
| 5,097,236 A | 3/1992 | Wakino et al. |
| 5,103,197 A | 4/1992 | Turunen |
| 5,109,536 A | 4/1992 | Kommrusch |
| 5,155,493 A | 10/1992 | Thursby et al. |
| 5,157,363 A | 10/1992 | Puurunen |
| 5,159,303 A | 10/1992 | Flink |
| 5,166,697 A | 11/1992 | Viladevall et al. |
| 5,170,173 A | 12/1992 | Krenz et al. |
| 5,203,021 A | 4/1993 | Repplinger et al. |
| 5,210,510 A | 5/1993 | Karsikas |
| 5,210,542 A | 5/1993 | Pett et al. |
| 5,220,335 A | 6/1993 | Huang |
| 5,229,777 A | 7/1993 | Doyle |
| 5,239,279 A | 8/1993 | Turunen |
| 5,278,528 A | 1/1994 | Turunen |
| 5,281,326 A | 1/1994 | Galla |
| 5,298,873 A | 3/1994 | Ala-Kojola |
| 5,302,924 A | 4/1994 | Jantunen |
| 5,304,968 A | 4/1994 | Ohtonen |
| 5,307,036 A | 4/1994 | Turunen |
| 5,319,328 A | 6/1994 | Turunen |
| 5,349,315 A | 9/1994 | Ala-Kojola |
| 5,349,700 A | 9/1994 | Parker |
| 5,351,023 A | 9/1994 | Niiranen |
| 5,354,463 A | 10/1994 | Turunen |
| 5,355,142 A | 10/1994 | Marshall et al. |
| 5,357,262 A | 10/1994 | Biaese |
| 5,363,114 A | 11/1994 | Shoemaker |
| 5,369,782 A | 11/1994 | Kawano et al. |
| 5,382,959 A | 1/1995 | Pett et al. |
| 5,386,214 A | 1/1995 | Sugawara |
| 5,387,886 A | 2/1995 | Takalo |
| 5,394,162 A | 2/1995 | Korovesis et al. |
| RE34,898 E | 4/1995 | Turunen |
| 5,408,206 A | 4/1995 | Turunen |
| 5,418,508 A | 5/1995 | Puurunen |
| 5,432,489 A | 7/1995 | Yrjola |
| 5,438,697 A | 8/1995 | Fowler et al. |
| 5,440,315 A | 8/1995 | Wright et al. |
| 5,442,366 A | 8/1995 | Sanford |
| 5,444,453 A | 8/1995 | Lalezari |
| 5,467,065 A | 11/1995 | Turunen |
| 5,473,295 A | 12/1995 | Turunen |
| 5,767,809 A | 3/1996 | Chuang et al. |
| 5,506,554 A | 4/1996 | Ala-Kojola |
| 5,508,668 A | 4/1996 | Prokkola |
| 5,510,802 A | 4/1996 | Tsuru et al. |
| 5,517,683 A | 5/1996 | Collett et al. |
| 5,521,561 A | 5/1996 | Yrjola |
| 5,526,003 A | 6/1996 | Ogawa et al. |
| 5,532,703 A | 7/1996 | Stephens et al. |
| 5,541,560 A | 7/1996 | Turunen |
| 5,541,617 A | 7/1996 | Connolly et al. |
| 5,543,764 A | 8/1996 | Turunen |
| 5,550,519 A | 8/1996 | Korpela |
| 5,557,287 A | 9/1996 | Pottala et al. |
| 5,557,292 A | 9/1996 | Nygren et al. |
| 5,566,441 A | 10/1996 | Marsh et al. |
| 5,570,071 A | 10/1996 | Ervasti |
| 5,585,771 A | 12/1996 | Ervasti |
| 5,585,810 A | 12/1996 | Tsuru et al. |
| 5,589,844 A | 12/1996 | Belcher et al. |
| 5,594,395 A | 1/1997 | Niiranen |
| 5,604,471 A | 2/1997 | Rattila |
| 5,627,502 A | 5/1997 | Ervasti |
| 5,649,316 A | 7/1997 | Prudhomme et al. |
| 5,668,561 A | 9/1997 | Perrotta et al. |
| 5,675,301 A | 10/1997 | Nappa |
| 5,689,221 A | 11/1997 | Niiranen |
| 5,694,135 A | 12/1997 | Dikun et al. |
| 5,696,517 A | 12/1997 | Kawahata et al. |
| 5,703,600 A | 12/1997 | Burrell et al. |
| 5,709,823 A | 1/1998 | Hayes et al. |
| 5,711,014 A | 1/1998 | Crowley et al. |
| 5,717,368 A | 2/1998 | Niiranen |
| 5,731,749 A | 3/1998 | Yrjola |
| 5,734,305 A | 3/1998 | Ervasti |
| 5,734,350 A | 3/1998 | Deming et al. |
| 5,734,351 A | 3/1998 | Ojantakanen |
| 5,736,965 A * | 4/1998 | Mosebrook ............ H01Q 1/007 315/312 |
| 5,739,735 A | 4/1998 | Pyykko |
| 5,742,259 A | 4/1998 | Annamaa |
| 5,757,327 A | 5/1998 | Yajima et al. |
| 5,777,585 A | 5/1998 | Tsuda et al. |
| 5,760,746 A | 6/1998 | Kawahata |
| 5,764,190 A | 6/1998 | Murch et al. |
| 5,768,217 A | 6/1998 | Sonoda et al. |
| 5,777,581 A | 7/1998 | Lilly et al. |
| 5,793,269 A | 8/1998 | Ervasti |
| 5,797,084 A | 8/1998 | Tsuru et al. |
| 5,812,094 A | 9/1998 | Maldonado |
| 5,815,048 A | 9/1998 | Ala-Kojola |
| 5,822,705 A | 10/1998 | Lehtola |
| 5,852,421 A | 12/1998 | Maldonado |
| 5,861,854 A | 1/1999 | Kawahata et al. |
| 5,874,926 A | 2/1999 | Tsuru et al. |
| 5,880,697 A | 3/1999 | McCarrick et al. |
| 5,886,668 A | 3/1999 | Pedersen et al. |
| 5,892,490 A | 4/1999 | Asakura et al. |
| 5,903,820 A | 5/1999 | Hagstrom |
| 5,905,475 A | 5/1999 | Annamaa |
| 5,920,290 A | 7/1999 | McDonough et al. |
| 5,926,139 A | 7/1999 | Korisch |
| 5,929,813 A | 7/1999 | Eggleston |
| 5,936,583 A | 8/1999 | Tadahiko et al. |

(56) References Cited

U.S. PATENT DOCUMENTS

| | | |
|---|---|---|
| 5,943,016 A | 8/1999 | Snyder, Jr. et al. |
| 5,952,975 A | 9/1999 | Pedersen et al. |
| 5,959,583 A | 9/1999 | Funk |
| 5,963,180 A | 10/1999 | Leisten |
| 5,966,097 A | 10/1999 | Fukasawa et al. |
| 5,970,393 A | 10/1999 | Khorrami et al. |
| 5,977,710 A | 11/1999 | Kuramoto et al. |
| 5,986,606 A | 11/1999 | Kossiavas et al. |
| 5,986,608 A | 11/1999 | Korisch et al. |
| 5,990,848 A | 11/1999 | Annamaa |
| 5,999,132 A | 12/1999 | Kitchener et al. |
| 6,005,529 A | 12/1999 | Hutchinson |
| 6,006,419 A | 12/1999 | Vandendolder et al. |
| 6,008,764 A | 12/1999 | Ollikainen |
| 6,009,311 A | 12/1999 | Killion et al. |
| 6,014,106 A | 1/2000 | Annamaa |
| 6,016,130 A | 1/2000 | Annamaa |
| 6,023,608 A | 2/2000 | Yriola |
| 6,031,496 A | 2/2000 | Kuittinen et al. |
| 6,034,637 A | 3/2000 | McCoy et al. |
| 6,037,848 A | 3/2000 | Alila |
| 6,043,780 A | 3/2000 | Funk et al. |
| 6,052,096 A | 4/2000 | Tsuru et al. |
| 6,072,434 A | 6/2000 | Papatheodorou |
| 6,078,231 A | 6/2000 | Pelkonen |
| 6,091,363 A | 7/2000 | Komatsu et al. |
| 6,091,365 A | 7/2000 | Anders et al. |
| 6,097,345 A | 8/2000 | Walton |
| 6,121,931 A | 9/2000 | Levi et al. |
| 6,133,879 A | 10/2000 | Grangeat et al. |
| 6,134,421 A | 10/2000 | Lee et al. |
| 6,140,966 A | 10/2000 | Pankinaho |
| 6,140,973 A | 10/2000 | Annamaa |
| 6,147,650 A | 11/2000 | Kawahata et al. |
| 6,157,819 A | 12/2000 | Vuokko |
| 6,177,908 B1 | 1/2001 | Kawahata |
| 6,185,434 B1 | 2/2001 | Hagstrom |
| 6,190,942 B1 | 2/2001 | Wilm et al. |
| 6,195,049 B1 | 2/2001 | Kim et al. |
| 6,204,826 B1 | 3/2001 | Rutkowski et al. |
| 6,215,376 B1 | 4/2001 | Hagstrom |
| 6,218,989 B1 | 4/2001 | Schneider et al. |
| 6,246,368 B1 | 6/2001 | Deming et al. |
| 6,252,552 B1 | 6/2001 | Tarvas et al. |
| 6,252,554 B1 | 6/2001 | Isohatala |
| 6,255,994 B1 | 7/2001 | Saito |
| 6,268,831 B1 | 7/2001 | Sanford |
| 6,281,848 B1 | 8/2001 | Nagumo et al. |
| 6,259,029 B1 | 9/2001 | Chen et al. |
| 6,297,776 B1 | 10/2001 | Pankinaho |
| 6,304,220 B1 | 10/2001 | Herve et al. |
| 6,308,720 B1 | 10/2001 | Modi |
| 6,316,975 B1 | 11/2001 | O'Toole et al. |
| 6,323,811 B1 | 11/2001 | Tsubaki |
| 6,326,921 B1 | 12/2001 | Egorov et al. |
| 6,337,663 B1 | 1/2002 | Chi-Minh |
| 6,340,954 B1 | 1/2002 | Annamaa et al. |
| 6,342,859 B1 | 1/2002 | Kurz et al. |
| 6,343,208 B1 | 1/2002 | Ying |
| 6,346,914 B1 | 2/2002 | Annamaa |
| 6,348,892 B1 | 2/2002 | Annamaa |
| 6,353,443 B1 | 2/2002 | Ying |
| 6,366,243 B1 | 4/2002 | Isohatala |
| 6,377,827 B1 | 4/2002 | Rydbeck |
| 6,380,905 B1 | 4/2002 | Annamaa |
| 6,396,444 B1 | 5/2002 | Goward |
| 6,404,394 B1 | 6/2002 | Hill |
| 6,417,813 B1 | 7/2002 | Durham et al. |
| 6,421,014 B1 | 7/2002 | Sanad |
| 6,423,915 B1 | 7/2002 | Winter |
| 6,112,108 A1 | 8/2002 | Crowley et al. |
| 6,429,818 B1 | 8/2002 | Johnson et al. |
| 6,452,551 B1 | 9/2002 | Chen |
| 6,452,558 B1 | 9/2002 | Saitou et al. |
| 6,456,249 B1 | 9/2002 | Johnson et al. |
| 6,459,413 B1 | 10/2002 | Tseng et al. |
| 6,462,716 B1 | 10/2002 | Kushihi |
| 6,469,673 B2 | 10/2002 | Kaiponen |
| 6,473,056 B2 | 10/2002 | Annamaa |
| 6,476,767 B2 | 11/2002 | Aoyama et al. |
| 6,476,769 B1 | 11/2002 | Lehtola |
| 6,480,155 B1 | 11/2002 | Eggleston |
| 6,483,462 B2 | 11/2002 | Weinberger |
| 6,498,586 B2 | 12/2002 | Pankinaho |
| 6,501,425 B1 | 12/2002 | Nagumo |
| 6,515,625 B1 | 2/2003 | Johnson |
| 6,518,925 B1 | 2/2003 | Annamaa |
| 6,529,168 B2 | 3/2003 | Mikkola |
| 6,529,749 B1 | 3/2003 | Hayes et al. |
| 6,535,170 B2 | 3/2003 | Sawamura et al. |
| 6,538,604 B1 | 3/2003 | Isohatala |
| 6,538,607 B2 | 3/2003 | Barna |
| 6,542,050 B1 | 4/2003 | Arai et al. |
| 6,549,167 B1 | 4/2003 | Yoon |
| 6,552,686 B2 | 4/2003 | Ollikainen et al. |
| 6,556,812 B1 | 4/2003 | Pennanen et al. |
| 6,566,944 B1 | 5/2003 | Pehlke |
| 6,580,396 B2 | 6/2003 | Lin |
| 6,580,397 B2 | 6/2003 | Kuriyama et al. |
| 6,600,449 B2 | 7/2003 | Onaka |
| 6,650,295 B2 | 7/2003 | Ollikainen et al. |
| 6,603,430 B1 | 8/2003 | Hill et al. |
| 6,606,016 B2 | 8/2003 | Takamine et al. |
| 6,611,235 B2 | 8/2003 | Barna et al. |
| 6,614,400 B2 | 9/2003 | Egorov |
| 6,614,401 B2 | 9/2003 | Onaka et al. |
| 6,614,405 B1 | 9/2003 | Mikkoken |
| 5,442,280 A1 | 10/2003 | Johnson |
| 6,634,564 B2 | 10/2003 | Kuramochi |
| 6,636,181 B2 | 10/2003 | Asano |
| 6,639,564 B2 | 10/2003 | Johnson |
| 6,646,606 B2 | 11/2003 | Mikkola |
| 6,657,593 B2 | 12/2003 | Nagumo et al. |
| 6,657,595 B1 | 12/2003 | Phillips et al. |
| 6,670,926 B2 | 12/2003 | Miyasaka |
| 6,677,903 B2 | 1/2004 | Wang |
| 6,680,705 B2 | 1/2004 | Tan et al. |
| 6,683,573 B2 | 1/2004 | Park |
| 6,693,594 B2 | 2/2004 | Pankinaho et al. |
| 6,717,551 B1 | 4/2004 | Desclos et al. |
| 6,727,857 B2 | 4/2004 | Mikkola |
| 6,734,825 B1 | 5/2004 | Guo et al. |
| 6,734,826 B1 | 5/2004 | Dai et al. |
| 6,738,022 B2 | 5/2004 | Varjakka |
| 6,741,214 B1 | 5/2004 | Kadambi et al. |
| 6,759,989 B2 | 7/2004 | Tarvas et al. |
| 6,765,536 B2 | 7/2004 | Phillips et al. |
| 6,774,853 B2 | 8/2004 | Wong et al. |
| 6,781,545 B2 | 8/2004 | Sung |
| 6,801,166 B2 | 10/2004 | Mikkola |
| 6,801,169 B1 | 10/2004 | Chang et al. |
| 6,806,835 B2 | 10/2004 | Iwai |
| 6,819,287 B2 | 11/2004 | Sullivan et al. |
| 6,819,293 B2 | 11/2004 | Antonius et al. |
| 6,825,818 B2 | 11/2004 | Toncich |
| 6,836,249 B2 | 12/2004 | Kenoun et al. |
| 6,847,329 B2 | 1/2005 | Ikegaya et al. |
| 6,856,293 B2 | 2/2005 | Bordi |
| 6,862,437 B1 | 3/2005 | McNamara |
| 6,862,441 B2 | 3/2005 | Ella |
| 6,873,291 B2 | 3/2005 | Aoyama |
| 6,876,329 B2 | 4/2005 | Milosavljevic |
| 6,882,317 B2 | 4/2005 | Koskiniemi |
| 6,891,507 B2 | 5/2005 | Kushihi et al. |
| 6,897,810 B2 | 5/2005 | Dai et al. |
| 6,900,768 B2 | 5/2005 | Iguchi et al. |
| 6,753,813 B2 | 6/2005 | Kushihi |
| 6,903,692 B2 | 6/2005 | Kivekas |
| 6,911,945 B2 | 6/2005 | Korva |
| 6,922,171 B2 | 7/2005 | Annamaa |
| 6,925,689 B2 | 8/2005 | Folkmar |
| 6,927,729 B2 | 8/2005 | Legay |
| 6,937,196 B2 | 8/2005 | Korva |
| 6,950,065 B2 | 9/2005 | Ying et al. |

(56) References Cited

U.S. PATENT DOCUMENTS

| | | |
|---|---|---|
| 6,950,066 B2 | 9/2005 | Hendler et al. |
| 6,950,068 B2 | 9/2005 | Bordi |
| 6,950,072 B2 | 9/2005 | Miyata et al. |
| 6,952,144 B2 | 10/2005 | Javor |
| 6,952,187 B2 | 10/2005 | Annamaa |
| 6,958,730 B2 | 10/2005 | Nagumo et al. |
| 6,961,544 B1 | 11/2005 | Hagstrom |
| 6,963,308 B2 | 11/2005 | Korva |
| 6,963,310 B2 | 11/2005 | Horita et al. |
| 6,967,618 B2 | 11/2005 | Ojantakanen |
| 6,975,278 B2 | 12/2005 | Song et al. |
| 6,980,158 B2 | 12/2005 | Iguchi et al. |
| 6,985,108 B2 | 1/2006 | Mikkola |
| 6,992,543 B2 | 1/2006 | Luetzelschwab et al. |
| 6,995,710 B2 | 2/2006 | Sugimoto et al. |
| 7,023,341 B2 | 4/2006 | Stilp |
| 7,031,744 B2 | 4/2006 | Kojima et al. |
| 7,034,752 B2 | 4/2006 | Sekiguchi et al. |
| 7,042,403 B2 | 5/2006 | Colburn et al. |
| 7,053,841 B2 | 5/2006 | Ponce De Leon et al. |
| 7,054,671 B2 | 5/2006 | Kaiponen et al. |
| 7,057,560 B2 | 6/2006 | Erkocevic |
| 7,061,430 B2 | 6/2006 | Zheng et al. |
| 7,081,857 B2 | 7/2006 | Kinnunen et al. |
| 7,084,831 B2 | 8/2006 | Takagi et al. |
| 7,099,690 B2 | 8/2006 | Milosavljevic |
| 7,113,133 B2 | 9/2006 | Chen et al. |
| 7,119,749 B2 | 10/2006 | Miyata et al. |
| 7,126,546 B2 | 10/2006 | Annamaa |
| 7,129,893 B2 | 10/2006 | Otaka et al. |
| 7,136,019 B2 | 11/2006 | Mikkola |
| 7,136,020 B2 | 11/2006 | Yamaki |
| 7,142,824 B2 | 11/2006 | Kojima et al. |
| 7,148,847 B2 | 12/2006 | Yuanzhu |
| 7,148,849 B2 | 12/2006 | Lin |
| 7,148,851 B2 | 12/2006 | Takaki et al. |
| 7,170,464 B2 | 1/2007 | Tang et al. |
| 7,176,838 B1 | 2/2007 | Kinezos |
| 7,180,455 B2 | 2/2007 | Oh et al. |
| 7,193,574 B2 | 3/2007 | Chiang et al. |
| 7,205,942 B2 | 4/2007 | Wang et al. |
| 7,215,283 B2 | 5/2007 | Boyle |
| 7,218,280 B2 | 5/2007 | Annamaa |
| 7,218,282 B2 | 5/2007 | Humpfer et al. |
| 7,224,313 B2 | 5/2007 | McKinzie, III et al. |
| 7,230,574 B2 | 6/2007 | Johnson |
| 7,233,775 B2 | 6/2007 | De Graauw |
| 7,237,318 B2 | 7/2007 | Annamaa |
| 7,256,743 B2 | 8/2007 | Korva |
| 7,274,334 B2 | 9/2007 | O'Riordan et al. |
| 7,283,097 B2 | 10/2007 | Wen et al. |
| 7,289,064 B2 | 10/2007 | Cheng |
| 7,292,200 B2 | 11/2007 | Posluszny et al. |
| 7,319,432 B2 | 1/2008 | Andersson |
| 7,330,153 B2 | 2/2008 | Rentz |
| 7,333,067 B2 | 2/2008 | Hung et al. |
| 7,339,528 B2 | 3/2008 | Wang et al. |
| 7,340,286 B2 | 3/2008 | Kempele |
| 7,345,634 B2 | 3/2008 | Ozkar et al. |
| 7,352,326 B2 | 4/2008 | Korva |
| 7,355,270 B2 | 4/2008 | Hasebe et al. |
| 7,358,902 B2 | 4/2008 | Erkocevic |
| 7,375,695 B2 | 5/2008 | Ishizuka et al. |
| 7,381,774 B2 | 6/2008 | Bish et al. |
| 7,385,556 B2 | 6/2008 | Chung et al. |
| 7,388,543 B2 | 6/2008 | Vance |
| 7,391,378 B2 | 6/2008 | Mikkola |
| 7,405,702 B2 | 7/2008 | Annamaa et al. |
| 6,100,849 A1 | 8/2008 | Tsubaki et al. |
| 7,417,588 B2 | 8/2008 | Castany et al. |
| 7,423,592 B2 | 9/2008 | Pros et al. |
| 7,432,860 B2 | 10/2008 | Huynh |
| 7,439,929 B2 | 10/2008 | Ozkar |
| 7,443,344 B2 | 10/2008 | Boyle |
| 7,468,700 B2 | 12/2008 | Milosavljevic |
| 7,468,709 B2 | 12/2008 | Niemi |
| 7,418,990 B2 | 3/2009 | Park et al. |
| 7,501,983 B2 | 3/2009 | Mikkola |
| 7,502,598 B2 | 3/2009 | Kronberger |
| 7,382,319 B2 | 6/2009 | Kaunari |
| 7,564,413 B2 | 7/2009 | Kim et al. |
| 7,589,678 B2 | 9/2009 | Nissinen et al. |
| 7,616,158 B2 | 11/2009 | Mark et al. |
| 7,633,449 B2 | 12/2009 | Oh |
| 7,663,551 B2 | 2/2010 | Nissinen |
| 7,679,565 B2 | 3/2010 | Sorvala |
| 7,692,543 B2 | 4/2010 | Copeland |
| 7,710,325 B2 | 5/2010 | Cheng |
| 7,724,204 B2 | 5/2010 | Annamaa |
| 7,760,146 B2 | 7/2010 | Ollikainen |
| 7,764,245 B2 | 7/2010 | Loyet |
| 7,786,938 B2 | 8/2010 | Sorvala |
| 7,800,544 B2 | 9/2010 | Thornell-Pers |
| 7,830,327 B2 | 11/2010 | He |
| 7,843,397 B2 | 11/2010 | Boyle |
| 7,889,139 B2 | 2/2011 | Hobson et al. |
| 7,889,143 B2 | 2/2011 | Milosavljevic |
| 7,901,617 B2 | 3/2011 | Taylor |
| 7,903,035 B2 | 3/2011 | Mikkola et al. |
| 7,916,086 B2 | 3/2011 | Koskiniemi et al. |
| 7,963,347 B2 | 6/2011 | Pabon |
| 7,973,720 B2 | 7/2011 | Sorvala |
| 8,049,670 B2 | 11/2011 | Jung et al. |
| 8,054,232 B2 | 11/2011 | Chiang et al. |
| 8,077,032 B1 * | 12/2011 | Vier .................. G08B 13/2491 340/3.1 |
| 8,098,202 B2 | 1/2012 | Annamaa et al. |
| 8,179,322 B2 | 5/2012 | Nissinen |
| 8,193,998 B2 | 6/2012 | Puente et al. |
| 8,466,756 B2 | 6/2013 | Milosavljevic et al. |
| 8,473,017 B2 | 6/2013 | Milosavljevic et al. |
| 8,564,485 B2 | 10/2013 | Milosavljevic et al. |
| 8,378,892 B2 | 1/2014 | Sorvala |
| 8,629,813 B2 | 1/2014 | Milosavljevic |
| 9,203,154 B2 | 12/2015 | Korva |
| 2001/0050636 A1 | 12/2001 | Weinberger |
| 2002/0183013 A1 | 12/2002 | Auckland et al. |
| 2002/0196192 A1 | 12/2002 | Nagumo et al. |
| 2003/0146873 A1 | 8/2003 | Blancho |
| 2004/0090378 A1 | 5/2004 | Dai et al. |
| 2004/0137950 A1 | 7/2004 | Bolin et al. |
| 2004/0145525 A1 | 7/2004 | Annabi et al. |
| 2004/0171403 A1 | 9/2004 | Mikkola |
| 2005/0057401 A1 | 3/2005 | Yuanzhu |
| 2005/0159131 A1 | 7/2005 | Shibagaki et al. |
| 2005/0176481 A1 | 8/2005 | Jeong |
| 2006/0071857 A1 | 4/2006 | Pelzer |
| 2006/0192723 A1 | 8/2006 | Harada |
| 2007/0042615 A1 | 2/2007 | Liao |
| 2007/0082789 A1 | 4/2007 | Nissila |
| 2007/0152881 A1 | 7/2007 | Chan |
| 2007/0188388 A1 | 8/2007 | Feng |
| 2005/0055164 A1 | 3/2008 | Zhang et al. |
| 2008/0059106 A1 | 3/2008 | Wight |
| 2008/0088511 A1 | 4/2008 | Sorvala |
| 2008/0096492 A1 | 4/2008 | Yoon |
| 2008/0174494 A1 | 7/2008 | Suzuki et al. |
| 2008/0266199 A1 | 10/2008 | Milosavljevic |
| 2009/0009415 A1 | 1/2009 | Tanska |
| 2009/0135066 A1 | 5/2009 | Raappana et al. |
| 2009/0153412 A1 | 6/2009 | Chiang et al. |
| 2009/0174604 A1 | 7/2009 | Keskitalo |
| 2009/0196160 A1 | 8/2009 | Crombach |
| 2009/0197654 A1 | 8/2009 | Teshima |
| 2009/0231213 A1 | 9/2009 | Ishimiya |
| 2010/0220016 A1 | 9/2010 | Nissinen |
| 2010/0244978 A1 | 9/2010 | Milosavljevic |
| 2010/0309092 A1 | 12/2010 | Lambacka |
| 2011/0045786 A1 | 2/2011 | Leinonen et al. |
| 2011/0133994 A1 | 6/2011 | Korva |
| 2011/0279232 A1 * | 11/2011 | Tuttle .................. G06K 19/0723 340/10.1 |
| 2012/0052820 A1 | 3/2012 | Lin et al. |

(56) References Cited

U.S. PATENT DOCUMENTS

| | | | |
|---|---|---|---|
| 2012/0057388 A1* | 3/2012 | Garrity | H02M 3/338 363/144 |
| 2012/0062424 A1 | 3/2012 | Hwang | |
| 2012/0093046 A1* | 4/2012 | Tikka | H01Q 1/521 370/297 |
| 2012/0098588 A1 | 4/2012 | Ujvari | |
| 2012/0119955 A1 | 5/2012 | Milosavljevic et al. | |
| 2012/0329407 A1 | 12/2012 | Rousu et al. | |
| 2013/0109370 A1 | 5/2013 | Rowson et al. | |
| 2013/0127670 A1 | 5/2013 | Desclos et al. | |
| 2013/0137487 A1 | 5/2013 | Sato | |
| 2013/0241780 A1 | 9/2013 | Amm et al. | |
| 2014/0087673 A1* | 3/2014 | Mostov | H03F 1/0227 455/78 |
| 2014/0106684 A1 | 4/2014 | Burns et al. | |
| 2014/0192845 A1 | 7/2014 | Szini et al. | |
| 2014/0307354 A1* | 10/2014 | Watanabe | H02H 9/041 361/56 |
| 2014/0333494 A1* | 11/2014 | Huang | H01Q 1/002 343/720 |
| 2014/0362038 A1* | 12/2014 | Murakami | G06F 3/0416 345/174 |
| 2015/0022403 A1 | 1/2015 | Lin | |
| 2015/0091762 A1* | 4/2015 | Hsiao | H01Q 1/243 343/702 |
| 2016/0173172 A1 | 6/2016 | Greene et al. | |

FOREIGN PATENT DOCUMENTS

| | | |
|---|---|---|
| DE | 10104862 | 8/2002 |
| DE | 10150149 | 4/2003 |
| EP | 0 208 424 | 1/1987 |
| EP | 0 376 643 | 4/1990 |
| EP | 0 751 043 | 4/1997 |
| EP | 0 807 988 | 11/1997 |
| EP | 0 831 547 | 3/1998 |
| EP | 0 851 530 | 7/1998 |
| EP | 1 294 048 | 1/1999 |
| EP | 1 014 487 | 6/2000 |
| EP | 1 024 553 | 8/2000 |
| EP | 1 067 627 | 1/2001 |
| EP | 0 923 158 | 9/2002 |
| EP | 1 329 980 | 7/2003 |
| EP | 1 361 623 | 11/2003 |
| EP | 1 406 345 | 4/2004 |
| EP | 1 453 137 | 9/2004 |
| EP | 1 220 456 | 10/2004 |
| EP | 1 467 456 | 10/2004 |
| EP | 1 753 079 | 2/2007 |
| FI | 20020829 | 11/2003 |
| FI | 118782 | 3/2008 |
| FR | 2553584 | 10/1983 |
| FR | 2724274 | 3/1996 |
| FR | 2873247 | 1/2006 |
| GB | 2266997 | 11/1993 |
| GB | 2360422 | 9/2001 |
| GB | 2389246 | 12/2003 |
| JP | 59-202831 | 11/1984 |
| JP | 60-206304 | 10/1985 |
| JP | 61-245704 | 11/1986 |
| JP | 06-152463 | 5/1994 |
| JP | 07-131234 | 5/1995 |
| JP | 07-221536 | 8/1995 |
| JP | 07-249923 | 9/1995 |
| JP | 07-307612 | 11/1995 |
| JP | 08-216571 | 8/1996 |
| JP | 09-083242 | 3/1997 |
| JP | 09-260934 | 10/1997 |
| JP | 09-307344 | 11/1997 |
| JP | 10-028013 | 1/1998 |
| JP | 10-107671 | 4/1998 |
| JP | 10-173423 | 6/1998 |
| JP | 10-209733 | 8/1998 |
| JP | 10-224142 | 8/1998 |
| JP | 10-322124 | 12/1998 |
| JP | 10-327011 | 12/1998 |
| JP | 11-004113 | 1/1999 |
| JP | 11-004117 | 1/1999 |
| JP | 11-068456 | 3/1999 |
| JP | 11-127010 | 5/1999 |
| JP | 11-127014 | 5/1999 |
| JP | 11-136025 | 5/1999 |
| JP | 11-355033 | 12/1999 |
| JP | 2000-278028 | 10/2000 |
| JP | 2001-053543 | 2/2001 |
| JP | 2001-267833 | 9/2001 |
| JP | 2001-217631 | 10/2001 |
| JP | 2001-326513 | 11/2001 |
| JP | 2002-319811 | 10/2002 |
| JP | 2002-329541 | 11/2002 |
| JP | 2002-335117 | 11/2002 |
| JP | 2003-060417 | 2/2003 |
| JP | 2003-124730 | 4/2003 |
| JP | 2003-179426 | 6/2003 |
| JP | 2004-112028 | 4/2004 |
| JP | 2004-363859 | 12/2004 |
| JP | 2005-005985 | 1/2005 |
| JP | 2005-252661 | 9/2005 |
| KR | 20010080521 | 10/2001 |
| KR | 20020096016 | 12/2002 |
| KR | 20130133853 A | 12/2013 |
| SE | 511900 | 12/1999 |
| TW | M460421 U | 8/2013 |
| WO | WO 1992/000635 | 1/1992 |
| WO | WO 1996/027219 | 9/1996 |
| WO | WO 1998/001919 | 1/1998 |
| WO | WO 1999/030479 | 6/1999 |
| WO | WO 2001/020718 | 3/2001 |
| WO | WO 2001/029927 | 4/2001 |
| WO | WO 2001/033665 | 5/2001 |
| WO | WO 2001/061781 | 8/2001 |
| WO | WO 2004/017462 | 2/2004 |
| WO | WO 2004/057697 | 7/2004 |
| WO | WO 2004/100313 | 11/2004 |
| WO | WO 2004/112189 | 12/2004 |
| WO | WO 2005/062416 | 7/2005 |
| WO | WO 2007/012697 | 2/2007 |
| WO | WO 2010/122220 | 10/2010 |

OTHER PUBLICATIONS

"Dual Band Antenna for Hand Held Portable Telephones", Liu et al., Electronics Letters, vol. 32, No. 7, 1996, pp. 609-610.

"Improved Bandwidth of Microstrip Antennas using Parasitic Elements," IEE Proc. vol. 127, Pt. H. No. 4, Aug. 1980.

"A 13.56MHz RFID Device and Software for Mobile Systems", by H. Ryoson, et al., Micro Systems Network Co., 2004 IEEE, pp. 241-244.

"A Novel Approach of a Planar Multi-Band Hybrid Series Feed Network for Use in Antenna Systems Operating at Millimeter Wave Frequencies," by M.W. Elsallal and B.L. Hauck, Rockwell Collins, Inc., 2003 pp. 15-24, waelsall@rockwellcollins.com and blhauck@rockwellcollins.com.

Abedin, M. F. And M. Ali, "Modifying the ground plane and its effect on planar inverted-F antennas (PIFAs) for mobile handsets," *IEEE Antennas and Wireless Propagation Letters*, vol. 2, 226-229, 2003.

C. R. Rowell and R. D. Murch, "A compact PIFA suitable for dual frequency 900/1800-MHz operation," *IEEE Trans. Antennas Propag.*, vol. 46, No. 4, pp. 596-598, Apr. 1998.

Cheng-Nan Hu, Willey Chen, and Book Tai, "A Compact Multi-Band Antenna Design for Mobile Handsets", *APMC 2005 Proceedings*.

Endo, T., Y. Sunahara, S. Satoh and T. Katagi, "Resonant Frequency and Radiation Efficiency of Meander Line Antennas," Electronics and Commu-nications in Japan. Part 2, vol. 83, No. 1, 52-58, 2000.

European Office Action, dated May 30, 2005 issued during prosecution of EP 04 396 001.2-1248.

Examination Report dated May 3, 2006 issued by the EPO for European Patent Application No. 04 396 079.8.

(56) References Cited

OTHER PUBLICATIONS

F.R. Hsiao, et al. "A dual-band planar inverted-F patch antenna with a branch-line slit," *Microwave Opt. Technol. Lett.*, vol. 32, Feb. 20, 2002.

Griffin, Donald W. et al., "Electromagnetic Design Aspects of Packages for Monolithic Microwave Integrated Circuit-Based Arrays with Integrated Antenna Elements", IEEE Transactions on Antennas and Propagation, vol. 43, No. 9, pp. 927-931, Sep. 1995.

Guo, Y. X. and H. S. Tan, "New compact six-band internal antenna," *IEEE Antennas and Wireless Propagation Letters*, vol. 3, 295-297, 2004.

Guo, Y. X. and Y.W. Chia and Z. N. Chen, "Miniature built-in quadband antennas for mobile handsets", *IEEE Antennas Wireless Propag. Lett.*, vol. 2, pp. 30-32, 2004.

Hoon Park, et al. "Design of an Internal antenna with wide and multiband characteristics for a mobile handset", *IEEE Microw. & Opt. Tech. Lett.* vol. 48, No. 5, May 2006.

Hoon Park, et al. "Design of Planar Inverted-F Antenna With Very Wide Impedance Bandwidth", *IEEE Microw. & Wireless Comp., Lett.*, vol. 16, no. 3, pp. 113-115, Mar., 2006.

Hossa, R., A. Byndas, and M. E. Bialkowski, "Improvement of compact terminal antenna performance by incorporating open-end slots in ground plane," *IEEE Microwave and Wireless Components Letters*, vol. 14, 283-285, 2004.

I. Ang, Y. X. Guo, and Y. W. Chia, "Compact internal quad-band antenna for mobile phones" *Micro. Opt. Technol. Lett.*, vol. 38, No. 3, pp. 217-223, Aug. 2003.

International Preliminary Report on Patentability for International Application No. PCT/FI2004/000554, dated May 1, 2006.

Jing, X., et al.; "Compact Planar Monopole Antenna for Multi-Band Mobile Phones"; Microwave Conference Proceedings, Dec. 4-7, 2005, APMC 2005, Asia-Pacific Conference Proceedings, vol. 4.

Kim, B. C., J. H. Yun, and H. D. Choi, "Small wideband PIFA for mobile phones at 1800 MHz," *IEEE International Conference on Vehicular Technology*, 27(29, Daejeon, South Korea, May 2004.

Kim, Kihong et al., "Integrated Dipole Antennas on Silicon Substrates for Intra-Chip Communication", IEEE, pp. 1582-1585, 1999.

Kivekas., O., J. Ollikainen, T. Lehtiniemi, and P. Vainikainen, "Bandwidth, SAR, and eciency of internal mobile phone antennas," *IEEE Transactions on Electromagnetic Compatibility*, vol. 46, 71{86, 2004.

K-L Wong, Planar Antennas for Wireless Communications, Hoboken, NJ: Willey, 2003, ch. 2.

Lindberg., P. and E. Ojefors, "A bandwidth enhancement technique for mobile handset antennas using wavetraps," *IEEE Transactions on Antennas and Propagation*, vol. 54, 2226{2232, 2006.

Marta Martinez- Vazquez, et al., "Integrated Planar Multiband Antennas for Personal Communication Handsets", *IEEE Trasactions on Antennas and propagation*, vol. 54, No. 2, Feb. 2006.

P. Ciais, et al., "Compact Internal Multiband Antennas for Mobile and WLAN Standards", *Electronic Letters*, vol. 40, No. 15, pp. 920-921, Jul., 2004.

P. Ciais, R. Staraj, G. Kossiavas, and C. Luxey, "Design of an internal quadband antenna for mobile phones", *IEEE Microwave Wireless Comp. Lett.*, vol. 14, No. 4, pp. 148-150, Apr. 2004.

P. Salonen, et al. "New slot configurations for dual-band planar inverted-F antenna," *Microwave Opt. Technol.*, vol. 28, pp. 293-298, 2001.

Papapolymerou, Ioannis et al., "Micromachined Patch Antennas", IEEE Transactions on Antennas and Propagation, vol. 46, No. 2, pp. 275-283, Feb. 1998.

Product of the Month, RFDesign, "GSM/GPRS Quad Band Power Amp Includes Antenna Switch," 1 page, reprinted Nov. 2004 issue of RF Design (www.rfdesign.com), Copyright 2004, Freescale Semiconductor, RFD-24-EK.

S. Tarvas, et al, "An internal dual-band mobile phone antenna," in *2000 IEEE Antennas Propagat. Soc. Int. Symp. Dig.*, pp. 266-269, Salt Lake City, UT, USA.

Wang, F., Z. Du, Q. Wang, and K. Gong, "Enhanced-bandwidth PIFA with T-shaped ground plane," *Electronics Letters*, vol. 40, 1504-1505, 2004.

Wang, H.; "Dual-Resonance Monopole Antenna with Tuning Stubs"; IEEE Proceedings, Microwaves, Antennas & Propagation, vol. 153, No. 4, Aug. 2006; pp. 395-399.

Wong, K., et al.; "A Low-Profile Planar Monopole Antenna for Multiband Operation of Mobile Handsets"; IEEE Transactions on Antennas and Propagation, Jan. '03, vol. 51, No. 1.

X.-D, Cai and J.-Y. Li, Analysis of asymmetric TEM cell and its optimum design of electric field distribution, IEE Proc 136 (1989), 191-194.

X.-Q, Yang and K.-M. Huang, Study on the key problems of interaction between microwave and chemical reaction, Chin Jof Radio Sci 21 (2006), 802-809.

Chiu, C.-W., et al., "A Meandered Loop Antenna for LTE/WWAN Operations in a Smartphone," Progress in Electromagnetics Research C, vol. 16, pp. 147-160, 2010.

Lin, Sheng-Yu; Liu, Hsien-Wen; Weng, Chung-Hsun; and Yang, Chang-Fa, "A miniature Coupled loop Antenna to be Embedded in a Mobile Phone for Penta-band Applications," Progress in Electromagnetics Research Symposium Proceedings, Xi'an, China, Mar. 22-26, 2010, pp. 721-724.

Zhang, Y.Q., et al. "Band-Notched UWB Crossed Semi-Ring Monopole Antenna," Progress in Electronics Research C, vol. 19, 107-118, 2011, pp. 107-118.

Joshi, Ravi K., et al., "Broadband Concentric Rings Fractal Slot Antenna", XXVIIIth General Assembly of International Union of Radio Science (URSI). (Oct. 23-29, 2005), 4 Pgs.

Singh, Rajender, "Broadband Planar Monopole Antennas," M.Tech credit seminar report, Electronic Systems group, EE Dept, IIT Bombay, Nov. 2003, pp. 1-24.

Gobien, Andrew, T. "Investigation of Low Profile Antenna Designs for Use in Hand-Held Radios,"Ch.3, *The Inverted-L Antenna and Variations*; Aug. 1997, pp. 42-76.

See, C.H., et al., "Design of Planar Metal-Plate Monopole Antenna for Third Generation Mobile Handsets," Telecommunications Research Centre, Bradford University, 2005, pp. 27-30.

Chen, Jin-Sen, et al., "CPW-fed Ring Slot Antenna with Small Ground Plane," Department of Electronic Engineering, Cheng Shiu University.

"LTE—an introduction," Ericsson White Paper, Jun. 2009, pp. 1-16.

"Spectrum Analysis for Future LTE Deployments," Motorola White Paper, 2007, pp. 1-8.

Chi, Yun-Wen, et al. "Quarter-Wavelength Printed Loop Antenna With an Internal Printed Matching Circuit for GSM/DCS/PCS/UMTS Operation in the Mobile Phone," IEEE Transactions on Antennas and Propagation, vol. 57, No. 9m Sep. 2009, pp. 2541-2547.

Wong, Kin-Lu, et al. "Planar Antennas for WLAN Applications," Dept. of Electrical Engineering, National Sun Yat-Sen University, 2002 09 Ansoft Workshop, pp. 1-45.

"$\lambda/4$ printed monopole antenna for 2.45GHz," Nordic Semiconductor, White Paper, 2005, pp. 1-6.

White, Carson, R., "Single- and Dual-Polarized Slot and Patch Antennas with Wide Tuning Ranges," The University of Michigan, 2008.

Extended European Search Report dated Jan. 30, 2013, issued by the EPO for EP Patent Application No. 12177740.3.

* cited by examiner

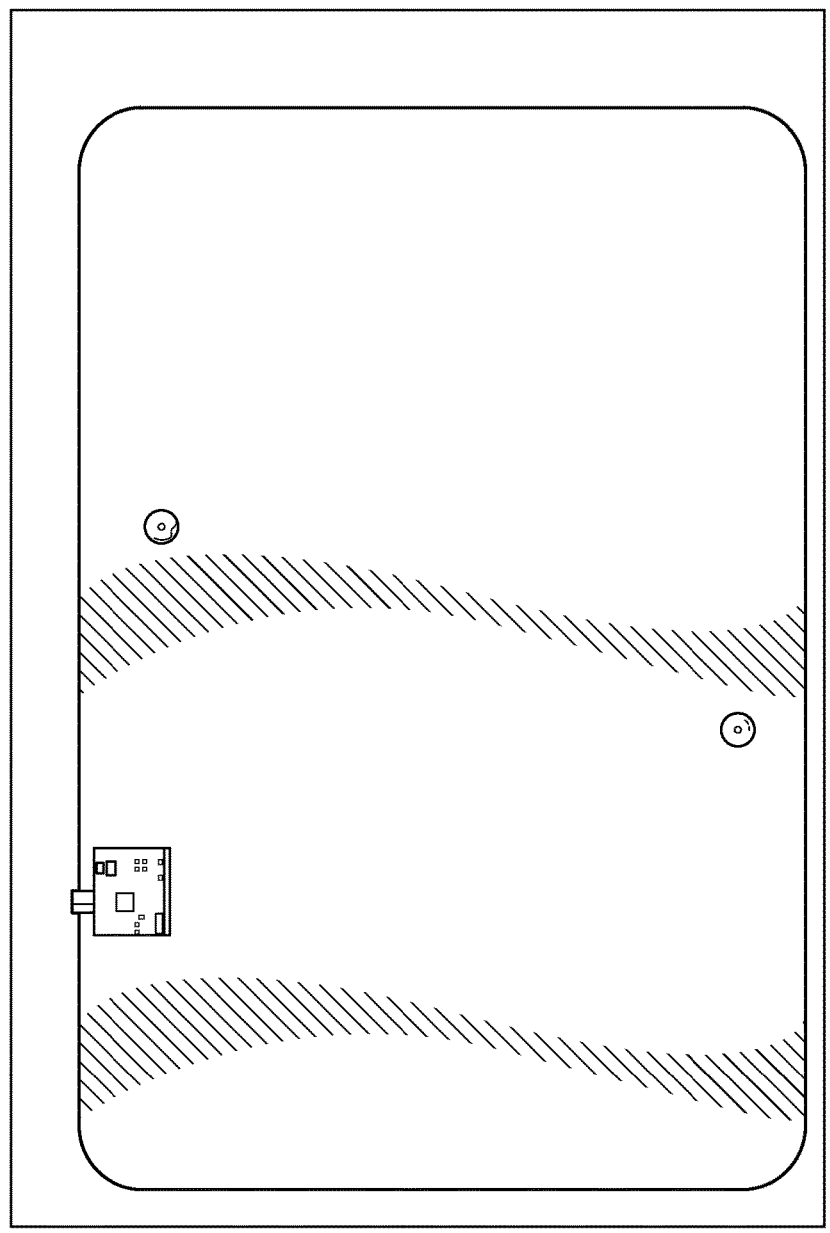

ANTENNA APPARATUS WITH AN INTEGRATED PROXIMITY SENSOR AND METHODS

PRIORITY

This application claims priority to co-owned U.S. Provisional Patent Application Ser. No. 62/042,020 filed Aug. 26, 2014 of the same title, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. TECHNOLOGICAL FIELD

The present disclosure relates generally to antenna solutions for portable wireless devices and particularly in one exemplary aspect to antenna solutions that incorporate an integrated proximity sensor.

2. DESCRIPTION OF RELATED TECHNOLOGY

Mobile devices with wireless communications capabilities such as mobile computers, mobile phones, smart phones, tablet computers, personal digital assistants (PDAs), "smart" watches, and other personal communication devices (PCDs) have become more ubiquitous and have practically become a necessity for modern life. As a greater variety of devices have entered the mobile computing space, devices have become lighter in weight and smaller in size while the functionality of these devices has increased greatly.

Specific Absorption Rate (SAR) is a measure of the rate at which electromagnetic energy is absorbed by the human body when exposed to, for example, a radio frequency (RF) electromagnetic field. Regulations (by e.g., the Federal Communications Commission (FCC)) exist to limit the SAR exposure users of mobile devices experience and thus limit the output power levels of such mobile devices. For example, the FCC limits RF exposure from cellular phones at a SAR level of 1.6 watts per kilogram (1.6 W/kg) taken over the volume containing a mass of 1 gram of tissue that absorbs the most signal. The European Union via the European Committee for Electrotechnical Standardization (CENELEC) limits RF exposure from mobile phones to 2 W/kg averaged over the 10 g of tissue absorbing the most signal. In mobile devices, to limit exposure to RF and to effectuate the regulations, proximity sensors are utilized to lower the power output of mobile devices in the presence of the human body.

Accordingly, there is a need for apparatus, systems and methods that provide for a smaller size antenna solution that also allow for compliance with SAR regulations. Ideally, such a solution would decrease the size requirements for the antenna/proximity sensor components located on a mobile communications device by, for example, sharing components between a Wireless Wide Area Network (WWAN) antenna solution and a proximity sensor, while also providing decreased noise levels for the devices over prior art solutions by connecting the proximity sensor in parallel with an RF signal path.

SUMMARY

The aforementioned needs are satisfied herein by providing an antenna solution (such as e.g., a WWAN antenna) with an integrated sensor and methods of using and calibrating the same.

In a first aspect, an antenna apparatus is disclosed. In one embodiment, the antenna apparatus includes an antenna feed element; a parasitic element capacitively coupled to the antenna feed element, the parasitic element configured to broaden the impedance bandwidth of the antenna feed element; a capacitor electrically coupled to a ground, the capacitor electrically coupled to the parasitic element; and a proximity sensor electrically coupled to the decoupling/ESD circuit such that the proximity sensor is coupled in parallel to the parasitic element, the proximity sensor configured to detect a change in capacitance in the parasitic element in the presence of a human body and lower an output power of the antenna feed element in response thereto and raise the output power of the antenna feed element in the absence of the human body.

In another embodiment, the antenna apparatus includes an antenna feed characterized by at least one resonating frequency; a grounded antenna component characterized to broaden impedance bandwidth; a proximity sensing element coupled to the grounded antenna component, the proximity sensing element configured to detect a change in capacitance in the grounded antenna component; and a capacitor providing radio frequency (RF) ground for the grounded antenna component but not at specific absorption rate (SAR) frequencies.

In a second aspect, a method of operating an antenna with an integrated proximity sensor is disclosed. In one embodiment, the method includes detecting a change in capacitance at the proximity sensor coupled in parallel to a grounded antenna component; based, at least in part, on the detecting the change in capacitance, sending, at the proximity sensor, a message indicating a presence of a human body; and lowering transmit power of the antenna based, at least in part, on receipt of the message.

BRIEF DESCRIPTION OF THE DRAWINGS

The features, objectives, and advantages of the disclosure will become more apparent from the detailed description set forth below when taken in conjunction with the drawings, wherein:

FIG. 4A-4H show various photographs of a prototype for a WWAN antenna apparatus with an integrated proximity sensor.

Figure 1:
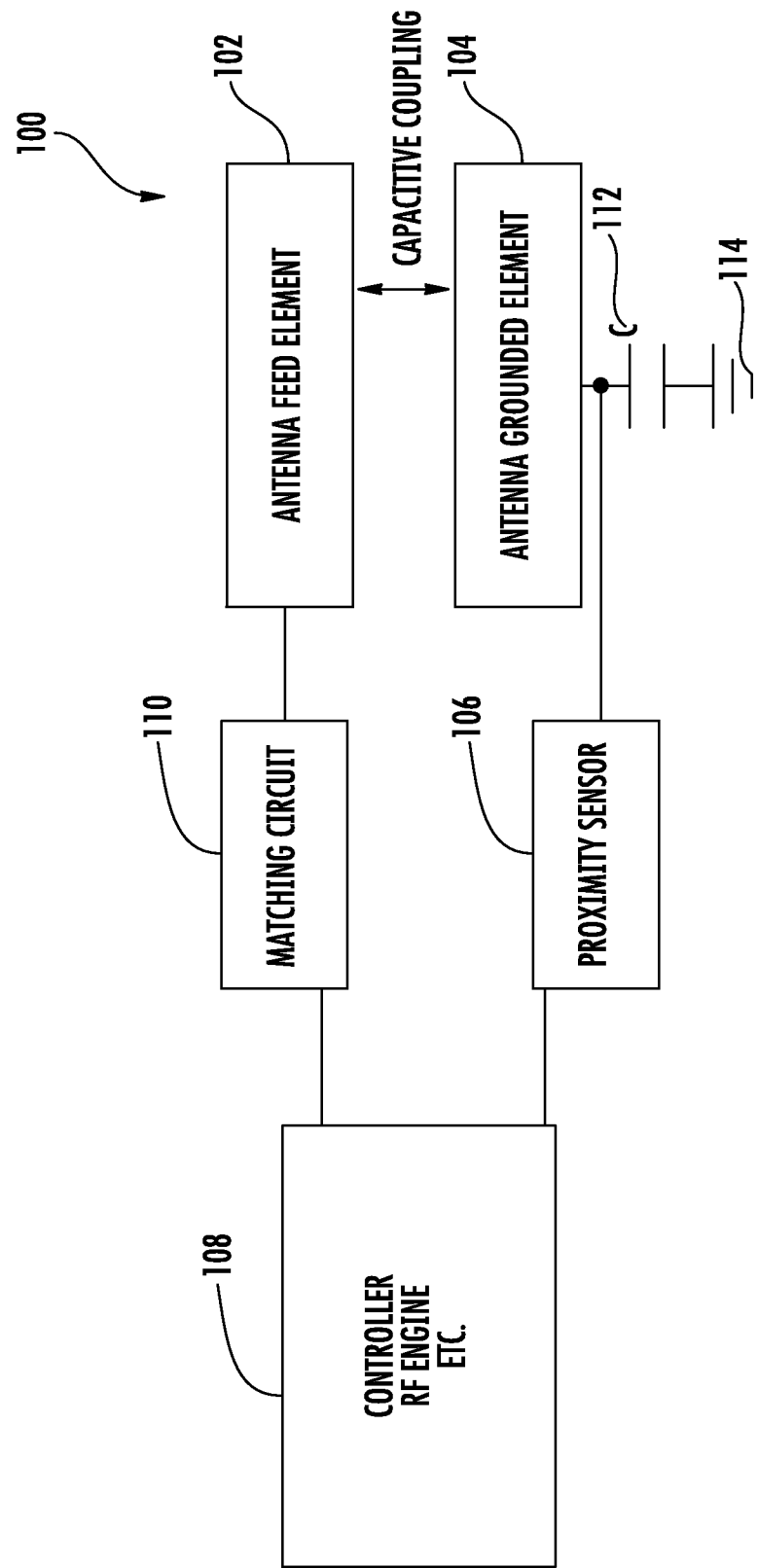
FIG. 1 is a block diagram of a first exemplary embodiment of a Wireless Wide Area Network (WWAN) antenna apparatus with an integrated proximity sensor in accordance with the principles of the present disclosure.

All Figures disclosed herein are © Copyright 2014 Pulse Finland Oy. All rights reserved.

DETAILED DESCRIPTION

Reference is now made to the drawings wherein like numerals refer to like parts throughout.

As used herein, the terms "antenna", and "antenna assembly" refer without limitation to any system that incorporates a single element, multiple elements, or one or more arrays of elements that receive/transmit and/or propagate one or more frequency bands of electromagnetic radiation. The radiation may be of numerous types, e.g., microwave, millimeter wave, radio frequency, digital modulated, analog, analog/digital encoded, digitally encoded millimeter wave energy, or the like. The energy may be transmitted from one location to another location, using, one or more repeater links, and one or more locations may be mobile, stationary, or fixed to a location on earth such as a base station.

As used herein, the terms "board" and "substrate" refer generally and without limitation to any substantially planar or curved surface or component upon which other components can be disposed. For example, a substrate may comprise a single or multi-layered printed circuit board (e.g., FR4), a semi-conductive die or wafer, or even a surface of a housing or other device component, and may be substantially rigid or alternatively at least somewhat flexible.

Furthermore, as used herein, the terms "radiator," "radiating plane," and "radiating element" refer without limitation to an element that can function as part of a system that receives and/or transmits radio-frequency electromagnetic radiation; e.g., an antenna. Hence, an exemplary radiator may receive electromagnetic radiation; transmit electromagnetic radiation; or both.

The terms "feed", and "RF feed" refer without limitation to any energy conductor and coupling element(s) that can transfer energy, transform impedance, enhance performance characteristics, and conform impedance properties between an incoming/outgoing RF energy signals to that of one or more connective elements, such as for example a radiator.

As used herein, the terms "top", "bottom", "side", "up", "down", "left", "right", and the like merely connote a relative position or geometry of one component to another, and in no way connote an absolute frame of reference or any required orientation. For example, a "top" portion of a component may actually reside below a "bottom" portion when the component is mounted to another device (e.g., to the underside of a PCB).

As used herein, the term "wireless" means any wireless signal, data, communication, or other interface including without limitation Wi-Fi, Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, Long Term Evolution (LTE) or LTE-Advanced (LTE-A), analog cellular, Zigbee, Near field communication (NFC)/RFID, CDPD, satellite systems such as GPS and GLONASS, and millimeter wave or microwave systems.

Overview

The present disclosure provides, inter alia, improved WWAN antenna apparatus with integrated proximity sensor and methods for utilizing and testing the same.

When the human body is exposed to an RF electromagnetic field, the tissue absorbs some of this power, i.e., a specific absorption rate (SAR). Proximity sensors allow a device, such as a mobile communications device, to control the SAR exposure by lowering the transmit power when in proximity to human tissue and increasing transmit power when not in proximity.

In embodiments of the present disclosure, an antenna subsystem and proximity sensing subsystem can share a grounded antenna component/parasitic element. The parasitic element can be used to: (i) broaden the operating band of the antenna feeding component, and (ii) provide an input (via a capacitance change) to a proximity sensor. In further embodiments, the proximity sensor is coupled in parallel to the RF signal path with respect to ground allowing for a reduction in noise because of increased isolation between the antenna subsystem and the sensing subsystem.

More specifically, embodiments of the WWAN antenna with integrated proximity sensor described herein offer: (1) reduced system noise over systems when the proximity sensor is connected in series to the RF signal path, (2) space savings as an antenna grounded element/parasitic element/passive radiator is shared between the antenna system and the proximity sensor element, and (3) the parasitic element can operate on multiple (i.e., two or more) frequency bands (e.g., 700 and 1800 MHz) which allows for the broadening of operating frequencies for the antenna element.

Methods of using and testing the aforementioned WWAN antenna with integrated proximity sensor are also disclosed.

Exemplary Embodiments

Detailed descriptions of the various embodiments and variants of the apparatus and methods of the present disclosure are now provided. While primarily discussed in the context of a WWAN antenna with an integrated proximity sensor, the various apparatus and methodologies discussed herein are not so limited. In fact, many of the apparatus and methodologies described herein are useful in the manufacture of any number of antenna apparatus that can benefit from the antenna grounded element/parasitic element, proximity sensor, and methods described herein, which may also be useful in different applications, and/or provide different signal conditioning functions.

Moreover, while primarily described in the exemplary context of an apparatus with a single antenna feed element, the various principles of the disclosure can be readily extended and applied to implementations having two or more antenna feed elements. Furthermore, while described primarily in the exemplary context of an apparatus with a WWAN antenna, the various apparatus and methodologies discussed herein are not so limited. Those of ordinary skill will readily understand that the teachings of the present disclosure can be applied to virtually any wireless system or wireless communication protocol(s).

Exemplary Antenna Element with Integrated Proximity Sensor

Referring now to FIG. 1, a first exemplary embodiment of a Wireless Wide Area Network (WWAN) antenna apparatus with an integrated proximity sensor is shown and described in detail. As shown, the integrated apparatus 100 includes an antenna feed element 102, an antenna grounded element 104, a proximity sensor 106, a controller 108, a matching circuit 110, and a capacitor 112 coupled to ground 114. Each of these components may be coupled to one or more substrates such as a printed circuit board (PCB).

Antenna feed element 102 may include a resonating element that is configured to resonate at either: (1) a single; or (2) multiple frequency bands (i.e., multi-band). These bands may comprise one or more individual bands configured to support one or more communications standards including, for example, Global System for Mobile Communications (GSM), Long Term Evolution (LTE), Wideband Code Division Multiple Access (W-CDMA), Code Division Multiple Access (CDMA), and/or other standards. For example, these frequency bands may in an exemplary embodiment include LTE 12 (698-746 MHz), LTE 17 (704 MHz to 746 MHz), LTE 13 (746 MHz to 787 MHz), LTE 14 (758 MHz to 798 MHz), LTE 20 (791 to 862 MHz), GSM850 (824 MHz to 894 MHz), E-GSM-900 (880 MHz to 960), DCS1800 (1710 MHz to 1880 MHz), PCS1900 (1850 MHz to 1990 MHz), WCDMA1 (1920 MHz to 2170 MHz), and LTE 7 (2500 MHz to 2690 MHz). Various other combinations or permutations of the foregoing (and in fact others) will be recognized by those of ordinary skill given the present disclosure.

In one embodiment, antenna feed element 102 can comprise a 7-band LTE antenna such as that described in U.S. patent application Ser. No. 13/989,404, entitled "MULTI-RESONANCE ANTENNA, ANTENNA MODULE, RADIO DEVICE AND METHODS" filed May 23, 2013, the contents of which are incorporated herein by reference in its entirety, which discloses, inter alia, two antenna elements of a monopole-type, which can be connected to a supply point, and one shared parasitic element which together provide two frequency bands to be utilized in the data processing device.

Antenna feed element 102 may be capacitively coupled to the antenna grounded element 104. Alternatively, the antenna feed element 102 may be coupled to the antenna grounded element 104 via one or more resistive/reactive elements. The antenna grounded element 104 can include a passive radiator or parasitic element. The antenna grounded element can be an RF grounded or floating metallization. In grounded embodiments the antenna grounded element 104 can resonate at $\lambda/4$ and in floating embodiments the antenna grounded element 104 can resonate at $\lambda/2$, where $\lambda$ is the wavelength of at least one operating band of the antenna. The antenna grounded element 104 may be used to broaden the impedance bandwidth of the antenna. As such, the parasitic element 104 may be active at a single or multiple bands in order to broaden the RF bands on the corresponding band.

The antenna ground element 104 can also change capacitance in the presence of other objects such as human tissue. Such capacitive change can be detected (by, e.g., a proximity sensor 106) and utilized to detect the presence or absence of, for example, human tissue. As such, the antenna grounded element 104 may be advantageously utilized by both the antenna system as well as the proximity sensing system in the apparatus 100.

The grounded antenna element 104 is, in an exemplary embodiment, coupled to a capacitor 112 to a grounded element 114. This coupling may include other reactive and/or resistive components in a parallel or series coupling so as to achieve desired RF ground characteristics. For example, as shown the capacitor 112 to ground 114 provides an RF ground but blocks (via high impedance) the direct current (DC) path. As a brief aside, a capacitor stores electrical charge. At high frequencies, the capacitor behaves as if it were a short. At low frequencies the capacitor behaves as if it were an open circuit. Thus, the capacitor is selected such that it presents a short to ground above a certain frequency i.e., it behaves as an RF ground.

The proximity sensor 106 is, in the illustrated embodiment, coupled to the grounded antenna element 104 in parallel with respect to ground. This parallel coupling allows for increased isolation between the antenna functionality and the proximity sensing functionality which in turn translates into a reduction of noise for the integrated apparatus 100. The proximity sensor 106 is, in an exemplary embodiment, a proximity sensor from the Azoteq ProxSense® line of proximity sensors (such as the IQS229) which utilizes the charge transfer method of capacitive sensing. However, it is appreciated that other proximity sensing apparatus and sensing methodologies may be utilized consistent with the principles of the present disclosure. Generally speaking, such sensors can detect changes in capacitance and can in turn output a signal to a controller (such as controller 108), which will in turn raise or lower the output power for the transmitter based on this detected change in capacitance.

In some embodiments, the detection of a capacitance change (from grounded antenna element 104) may be calibrated to work with the input system of the proximity sensor 106 such that the proximity sensor can accurately detect the presence of, for example, human tissue. The capacitance change detected by the proximity sensor 106 may have to be greater than a threshold value to send a signal to the controller 108 to raise or lower the transmit power. Alternatively, the absolute capacitance detected by the proximity sensor 106 may be utilized to determine whether to send a signal to the controller 108 to raise or lower the transmit power. In still other embodiments, the change in capacitance must exceed a minimum amount of time (i.e., transitory changes are insufficient to trigger a change).

In alternative embodiments, the proximity sensor 106 is coupled to the grounded antenna element 104 in series. While such configurations may provide less isolation between the sensing circuitry and the antenna path, other design considerations may take precedence (e.g., layout format, power consumption, etc.).

The controller 108 is, in the illustrated embodiment, an RF engine that controls the transmit power of the apparatus 100. As discussed previously herein, signals originating from the proximity sensor 106 are interpreted by the controller 108, which in turn is responsible for dictating the transmit power of the apparatus 100. Accordingly, when, for example, a body is brought in close proximity to the integrated apparatus, the sensed capacitance change is detected by the proximity sensor 106 which in turn transmits/sends a signal to the controller 108. The controller subsequently increases or decreases the output power fed to the antenna feed element 102.

Impedance matching in apparatus 100 is accomplished via a matching circuit 110 coupled to the controller 108 (e.g., RF engine). Additionally, frequency tuning for the antenna feed element 102 may be effectuated via impedance matching circuit 110.

Figure 2:
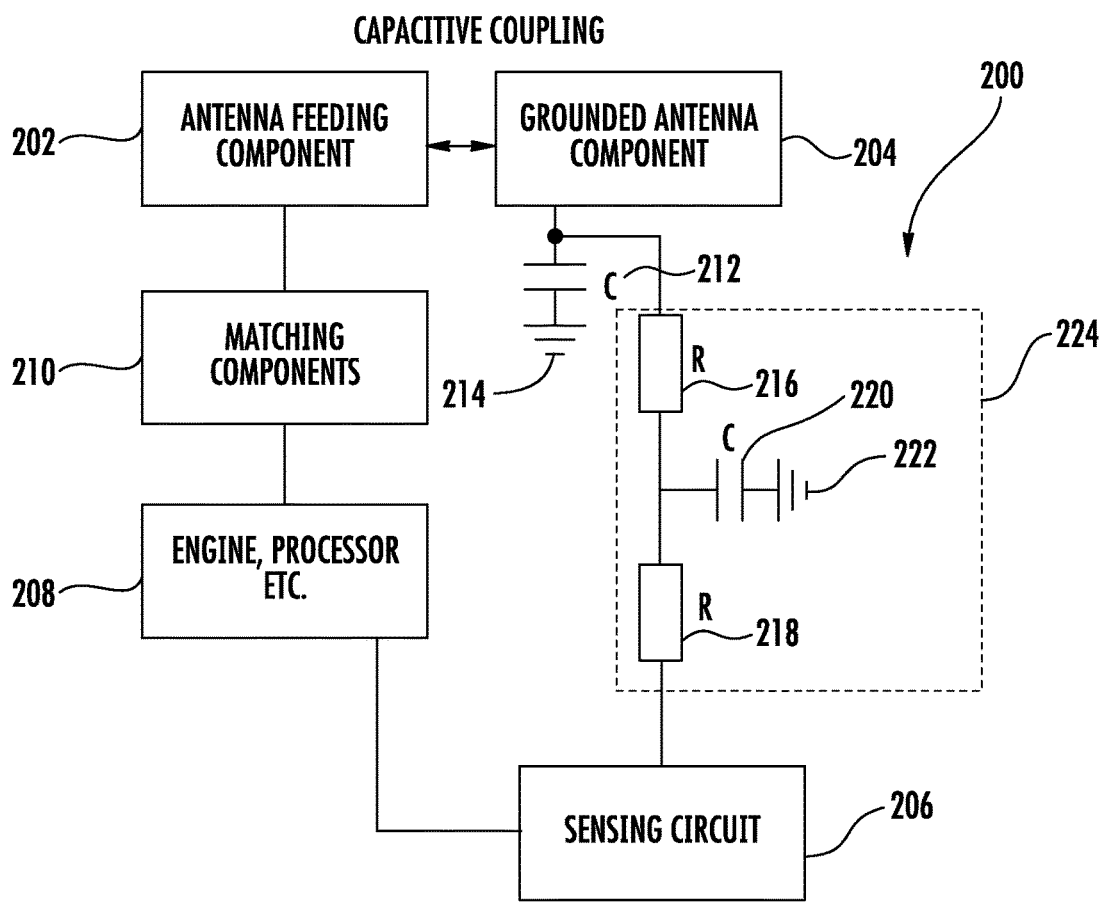
FIG. 2 is a block diagram of a second exemplary embodiment of a WWAN apparatus with an integrated proximity sensor in accordance with the principles of the present disclosure.

Referring now to FIG. 2, a second exemplary embodiment of a Wireless Wide Area Network (WWAN) antenna apparatus with an integrated proximity sensor is shown and described in detail. The embodiment illustrated in FIG. 2 is architecturally similar to the embodiment illustrated and discussed above with respect to FIG. 1, in that the antenna apparatus with integrated proximity sensor 200 includes an antenna feeding component 202, a grounded antenna component 204, a proximity sensing circuit 206, a controller 208, matching circuitry 210, and a capacitor 212 coupled to ground 214. Similar to the embodiment discussed above with reference to FIG. 1, the grounded antenna component 204 is coupled to the antenna feeding component 202 via capacitive coupling.

However, unlike the embodiment described above with reference to FIG. 1, a ESD/decoupling circuit 224 comprising resistors 216, 218 and a capacitor 220 coupled to ground 222 is also disposed between the grounded antenna component 204 and the proximity sensing circuit 206. Similar to its operation in FIG. 1, the grounded antenna component 204 changes capacitance in the presence of, for example, human tissue. However, the ESD/decoupling circuit 224 is configured to prevent an RF signal from going into the sensing circuit 206 so that a capacitance change can be detected. The ESD/decoupling circuit 224 may comprise any assortment of reactive/resistive components, which in combination with the grounded antenna component 204, results in a detectable change in capacitance for the proximity sensor at a desired distance.

The proximity sensing circuit 206 is further coupled to the ESD/decoupling circuit 224 and receives as input detected changes in capacitance of the grounded antenna component 204, as modified by the ESD/decoupling circuit 224. The sensing circuit 206 can then output a signal to inform the controller 208 regarding, for example, a change in proximity of a user. Similar to that discussed previously with regards to FIG. 1 discussed above, the controller 208 can subsequently be configured to alter the output power of the antenna feeding component 202 transmissions in order to, for example, comply with SAR regulations. The RF signal path for receiving incoming RF signals in the antenna apparatus 200 is fed to the controller 208 via the antenna feeding component 202 and matching circuit 210. The RF signal path of the antenna subsystem (e.g., antenna feeding component 202) is isolated from the signal path of the sensing subsystem as the grounded antenna component 204 is coupled to the sensing circuit 206 via a parallel circuit.

Method of Use

Figure 3:
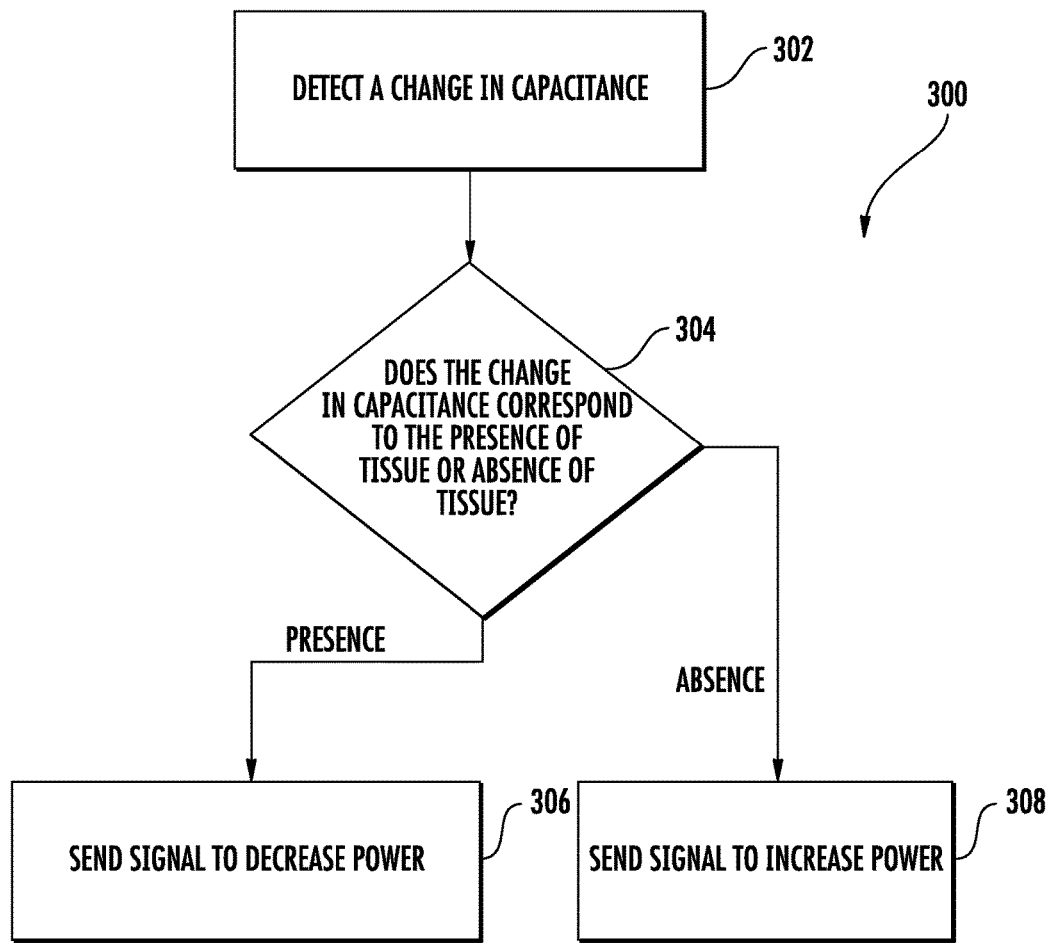
FIG. 3 is a logical flow diagram illustrating operation of the exemplary WWAN antenna apparatus with an integrated proximity sensor.

FIG. 3 illustrates a method of operating the exemplary embodiment of the WWAN antenna apparatus with integrated proximity sensor (e.g., FIGS. 1 and 2) of the disclosure. The operations of method 300 presented below are intended to be illustrative. In some implementations, method 300 may be accomplished via one or more additional operations. Methodology 300 may be implemented in one or more processing devices (e.g., a digital processor, an analog processor, a digital circuit designed to process information, an analog circuit designed to process information, a state machine, and/or other mechanisms for electronically processing information and/or execute computer program modules. The one or more processing devices may include one or more devices executing some or all of the operations of methods 300 in response to instructions stored electronically on an electronic storage medium. The one or more processing devices may include one or more devices configured through hardware, firmware, and/or software to be specifically designed for execution of one or more of the operations of method 300.

At step 302, a change in capacitance for the mobile device is detected. In one embodiment, the detected change in capacitance of a parasitic element (i.e., grounded antenna component 104, 204) is resultant from a signal input received by a proximity sensing circuit. In variants of the present disclosure, this signal input may have been conditioned (for example, via calibration circuit 224, FIG. 2) prior to being received by the proximity sensing circuit.

At step 304, a determination is made as to whether the detected change in capacitance of the parasitic element corresponds to the presence of, for example, human tissue.

When it is determined that a change in capacitance corresponds to the presence of, for example, human tissue, at step 306, a signal is sent from the proximity sensing circuit to a controller resulting in a decrease in transmit power for the antenna.

Alternatively, when it is determined that a change in capacitance corresponds to the absence of, for example, human tissue at step 308, a signal is sent from the proximity sensing circuit to a controller resulting in an increase in transmit power for the antenna.

Performance

FIGS. 4A through 6 present testing prototypes and performance results obtained during simulation and testing by the Assignee hereof of an exemplary WWAN antenna apparatus with integrated sensor according to one or more embodiments described above with respect to FIGS. 1 and 2.

Figure 4D:
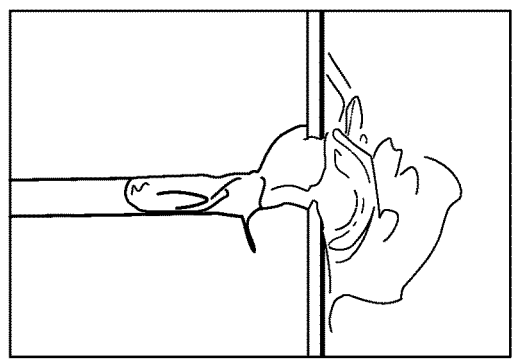
Figure 4E:
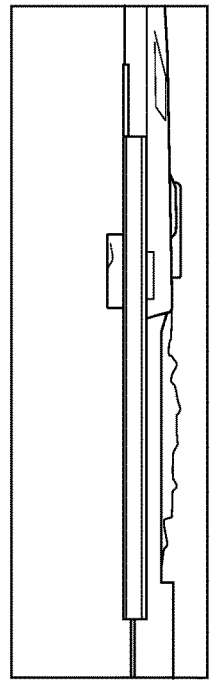
Figure 4B:
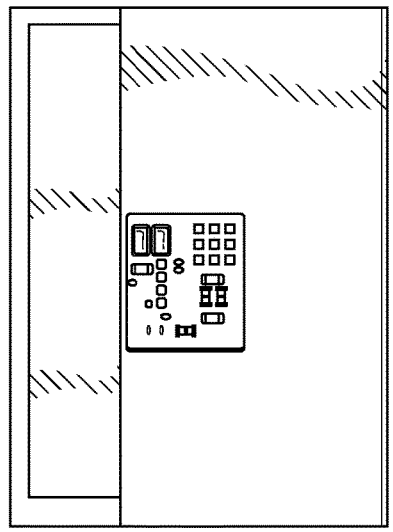
Figure 4C:
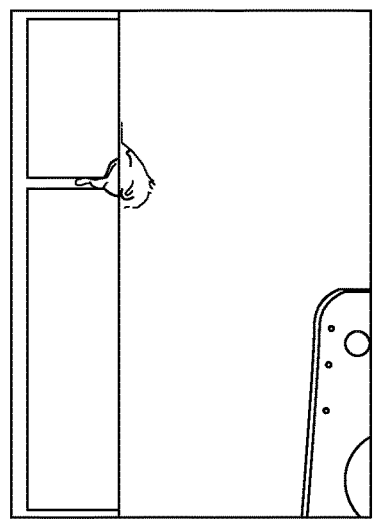
Figure 4F:
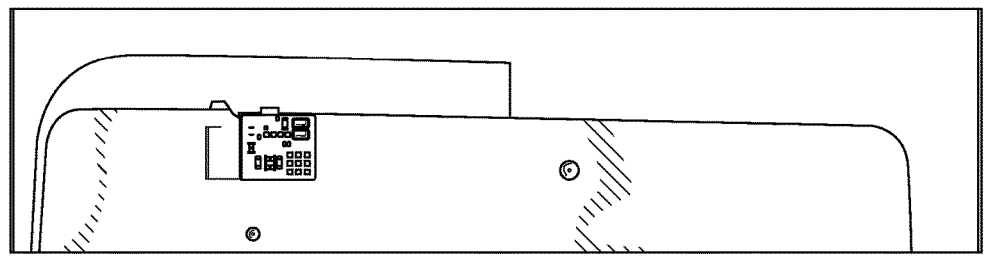
Figure 4G:
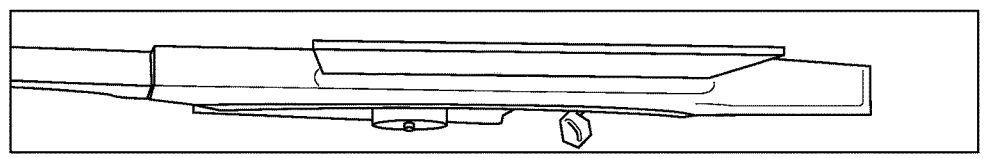
Figure 4H:
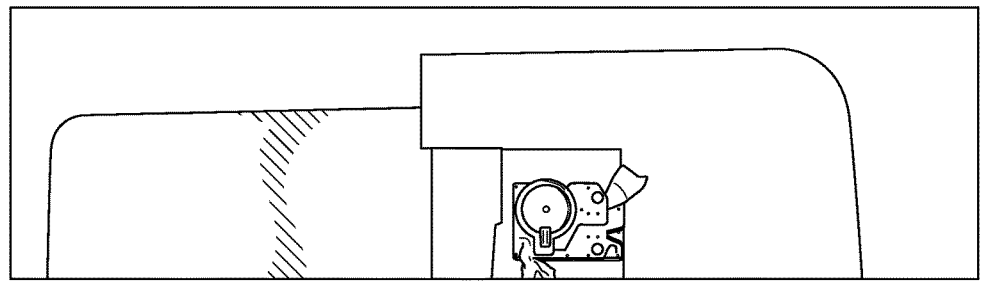

FIGS. 4A-4H illustrate photographs of a prototype of an exemplary WWAN antenna apparatus with integrated sensor according to one or more embodiments of the present disclosure. FIG. 4A illustrates the back side (e.g., a battery cover) of a chassis of size 216 mm×138 mm×6 mm on which the WWAN antenna apparatus with integrated proximity sensor is affixed. The proximity sensor shown in FIGS. 4A, 4B, and 4F is, in the illustrated embodiment, the Azoteq IQS229. FIGS. 4B and 4F illustrate various views of the back side of the chassis. FIGS. 4C and 4H illustrate the front side (e.g., display side) of the chassis. FIGS. 4D and 4G illustrate the top side of the chassis. FIG. 4E is a detailed view illustrating a capacitor coupled to ground and the proximity sensor contact point as shown in FIG. 4C. FIGS. 4B and 4C illustrate the antenna apparatus disposed on an antenna carrier of size 60 mm×11 mm×3 mm.

Figure 5:
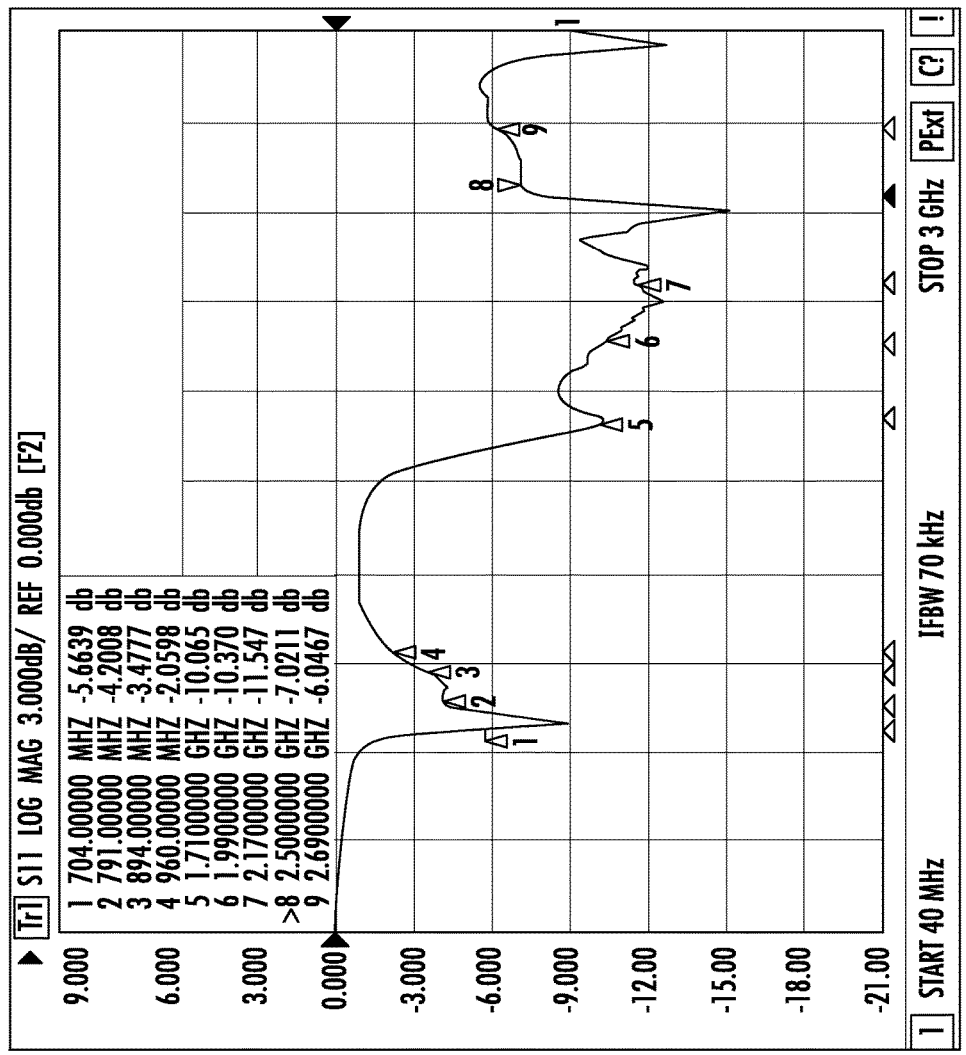
FIG. 5 is a chart illustrating, for example, free-space antenna return loss (in dB) as a function of frequency for the S11 antenna radiator.

FIG. 5 depicts the free-space antenna return loss (in dB) as a function of frequency for the antenna radiator as shown in, for example, FIGS. 4B and 4C. Specifically, the free-space antenna return loss is characterized at a number of different operational frequencies of interest. At 704 MHz, the free-space return loss is approximately −5.7 dB; at 791 MHz, the free-space return loss is approximately −4.2 dB; at 894 MHz, the free-space return loss is approximately −3.5 dB; at 960 MHz, the free-space return loss is approximately −2.1 dB; at 1.71 GHz, the free-space return loss is approximately −10.1 dB; at 1.99 GHz, the free-space return loss is approximately −10.4 dB; at 2.17 GHz, the free-space return loss is approximately −11.5 dB; at 2.50 GHz, the free-space return loss is approximately −7.0 dB; and at 2.69 GHz, the free-space return loss is approximately −6.0 dB.

Figure 6:
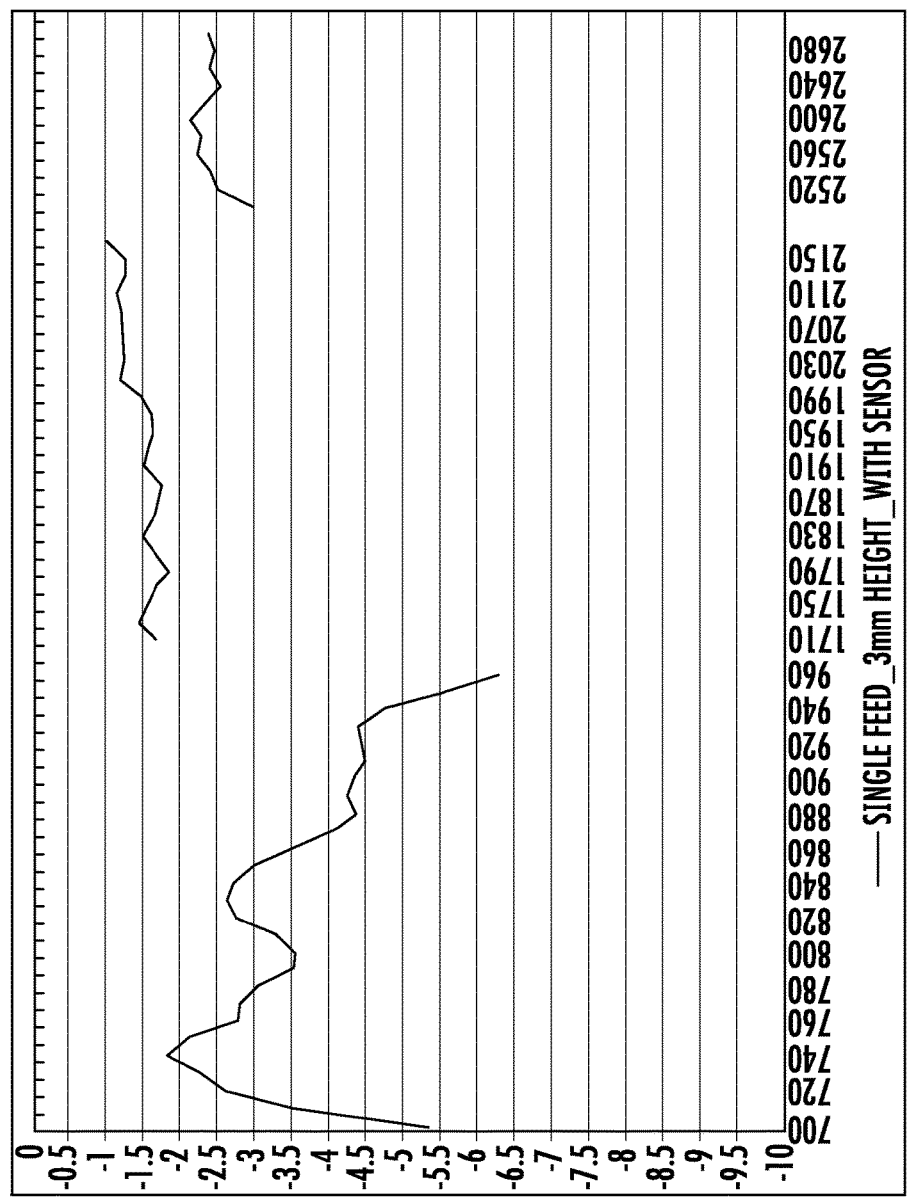
FIG. 6 is a chart illustrating, for example, free-space efficiency (in dB) obtained for the antenna shown in, for example, FIGS. 4B and 4C.

FIG. 6 presents data regarding free-space efficiency (in dB) obtained for the antenna shown in FIGS. 4B and 4C. Efficiency of an antenna (in dB) is may be defined decimal logarithm of a ratio of radiated to input power:

$$AntennaEfficiency = 10\log_{10}\left(\frac{\text{Radiated Power}}{\text{Input Power}}\right) \quad \text{(Eqn. 1)}$$

An efficiency of zero (0) dB corresponds to an ideal theoretical radiator, wherein all of the input power is radiated in the form of electromagnetic energy.

It will be recognized that while certain aspects of the present disclosure are described in terms of specific design examples, these descriptions are only illustrative of the broader methods of the disclosure, and may be modified as required by the particular design. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure described and claimed herein.

While the above detailed description has shown, described, and pointed out novel features of the present disclosure as applied to various embodiments, it will be understood that various omissions, substitutions, and changes in the form and details of the device or process illustrated may be made by those skilled in the art without departing from the principles of the present disclosure. The foregoing description is of the best mode presently contemplated of carrying out the present disclosure. This description is in no way meant to be limiting, but rather should be taken as illustrative of the general principles of the present disclosure. The scope of the present disclosure should be determined with reference to the claims.

What is claimed is:

1. An antenna apparatus, comprising:
an antenna feed element;
a parasitic element capacitively coupled to the antenna feed element, the parasitic element configured to broaden the impedance bandwidth of the antenna feed element;
a capacitor electrically coupled to a ground, the capacitor electrically coupled to the parasitic element; and
a proximity sensor electrically coupled to an ESD/decoupling circuit such that the proximity sensor is coupled in parallel to the parasitic element, the proximity sensor configured to detect a change in capacitance in the parasitic element in the presence of a human body and lower an output power of the antenna feed element in response thereto and to subsequently raise the output power of the antenna feed element in the absence of the human body;
wherein the ESD/decoupling circuit is electrically coupled in parallel to the parasitic element, the ESD/decoupling circuit being configured to block an RF signal from going into the proximity sensor so as to enable detection of a capacitance change.

2. The antenna apparatus of claim 1, further comprising:
a processing engine;
wherein the proximity sensor is configured to lower or raise the output power of the antenna feed element via a signal sent to the processing engine.

3. The antenna apparatus of claim 1, further comprising a matching circuit configured to provide frequency tuning of the antenna feed element.

4. The antenna apparatus of claim 1, wherein the ESD/decoupling circuit comprises two resistors coupled in parallel with another capacitor coupled to ground.

5. The antenna apparatus of claim 1, wherein the capacitor electrically coupled to the ground provides an radio frequency (RF) ground for the antenna feed element and blocks a direct current (DC) path via a high impedance.

6. The antenna apparatus of claim 1, wherein the parasitic element comprises a radio frequency (RF) metallization.

7. The antenna apparatus of claim 6, wherein the parasitic element comprises a grounded metallization with a $\lambda/4$ element.

8. The antenna apparatus of claim 6, wherein the parasitic element comprises a floating metallization with a $\lambda/2$ element.

9. The antenna apparatus of claim 6, wherein the parasitic element comprises a dual-band parasitic element.

10. The antenna apparatus of claim 9, wherein the antenna feeding component comprises a dual-band antenna feeding component.

11. The antenna apparatus of claim 1, wherein the ESD/decoupling circuit is galvanically coupled to the proximity sensor in series, and the ESD/decoupling circuit is disposed between the proximity sensor and the parasitic element.

12. An antenna apparatus, comprising:
an antenna feed characterized by at least one resonating frequency;
a grounded antenna component characterized to broaden impedance bandwidth;
a proximity sensing element coupled to the grounded antenna component, the proximity sensing element configured to detect a change in capacitance in the grounded antenna component;
a capacitor providing radio frequency (RF) ground for the grounded antenna component but not at specific absorption rate (SAR) frequencies; and
an ESD/decoupling circuit electrically coupled in parallel to the grounded antenna component, the ESD/decoupling circuit being configured to block an RF signal from going into the proximity sensing element so as to enable detection of a capacitance change.

13. The antenna apparatus of claim 12, further comprising:
an RF controller;
wherein the proximity sensing element is configured to decrease or increase an output power of the antenna feed via a signal sent to the RF controller.

14. The antenna apparatus of claim 12, further comprising a matching circuitry element configured to provide frequency tuning of the antenna feed.

15. The antenna apparatus of claim 12, wherein the grounded antenna component comprises an RF metallization.

16. The antenna apparatus of claim 12, wherein the antenna feeding component comprises a dual-band antenna feeding component, and the grounded antenna component comprises a dual-band parasitic element.

17. A method of operating an antenna with an integrated proximity sensor, the method comprising:
capacitively coupling the antenna with a grounded antenna component to broaden an impedance bandwidth for the antenna; and
detecting a change in capacitance at the proximity sensor coupled in parallel to the grounded antenna component, the detecting the change in capacitance further comprising blocking an RF signal from going into the proximity sensor using an ESD/decoupling circuit electrically coupled in parallel to the grounded antenna component so as to enable detection of the change in capacitance;
based, at least in part, on the detecting the change in capacitance, sending, at the proximity sensor, a message indicating a presence of a human body; and
lowering transmit power of the antenna based, at least in part, on receipt of the message.

18. The method of claim 17, further comprising:
detecting a second change in capacitance at the proximity sensor;
based, at least in part, on the detecting the second change in capacitance, sending, at the proximity sensor, a second message indicating an absence of a human body.

19. The method of claim 18, further comprising:
lowering the transmit power of the antenna based, at least in part, on receipt of the second message.

20. The method of claim 17, wherein the ESD/decoupling circuit is operative by coupling two resistors in parallel with a capacitor coupled to ground.

* * * * *